United States Patent [19]

Schultz

[11] 4,413,440
[45] Nov. 8, 1983

[54] GOPHER PROBE AND POISON DISPENSER

[76] Inventor: Harley D. Schultz, Star Route #1, Box 293, Anza, Calif. 92306

[21] Appl. No.: 259,060

[22] Filed: Apr. 30, 1981

[51] Int. Cl.³ ............................................. A01M 25/00
[52] U.S. Cl. ..................................... 43/124; 43/131; 111/95
[58] Field of Search ................... 43/124, 131; 111/7.1, 111/7.2, 7.3, 7.4, 95; 222/191, 510, 548

[56] References Cited

U.S. PATENT DOCUMENTS

| | | | |
|---|---|---|---|
| D. 215,119 | 9/1969 | Dozier | D52/2 |
| 1,540,660 | 6/1925 | Snow | 43/124 |
| 1,801,253 | 4/1931 | Amato | 43/124 |
| 1,890,391 | 12/1932 | Lane | 43/124 |
| 2,239,464 | 4/1941 | Moger | 43/124 |
| 2,243,510 | 5/1941 | Smith | 43/124 |
| 2,390,686 | 12/1945 | Bishop | 43/124 |
| 2,539,271 | 1/1951 | Rianda | 43/124 |
| 3,243,962 | 4/1966 | Ratliff | 111/7.4 |
| 3,550,542 | 12/1970 | Hollis | 43/124 |
| 3,771,474 | 11/1973 | Elston | 111/96 |

*Primary Examiner*—Nicholas P. Godici
*Assistant Examiner*—Kurt Rowan
*Attorney, Agent, or Firm*—Harvey B. Jacobson

[57] ABSTRACT

An upstanding tubular shank is provided and the lower end portion includes a tapered lower terminal end and a lateral opening formed therein closely spaced above the terminal end. A hollow poison reservoir is carried by and encircles a midportion of the shank intermediate the upper and lower end portions thereof and the midportion of the shank includes a lateral port opening into the interior of the reservoir for gravity flow of fluent poison material from the reservoir into the shank midportion and subsequent gravity flow downwardly through the shank into the lower end portion thereof and toward the lateral opening therein. A rotary valve member is oscillatably supported in the lower end portion of the shank and a valve actuator is oscillatably supported from the upper end of the shank. A connecting rod extends between and connects the actuator and the valve member and the valve actuator may be oscillated to shift the valve member between positions opening and closing the lateral opening from the inner end thereof. The upper end portion of the shank includes structure whereby a downward thrust on the shank may be applied to the latter for forcing the tapered lower terminal end into the ground and indicator structure is carried by the shank upper end portion for indicating the position of the actuator when the valve member is in the closed position.

1 Claim, 7 Drawing Figures

U.S. Patent  Nov. 8, 1983  4,413,440
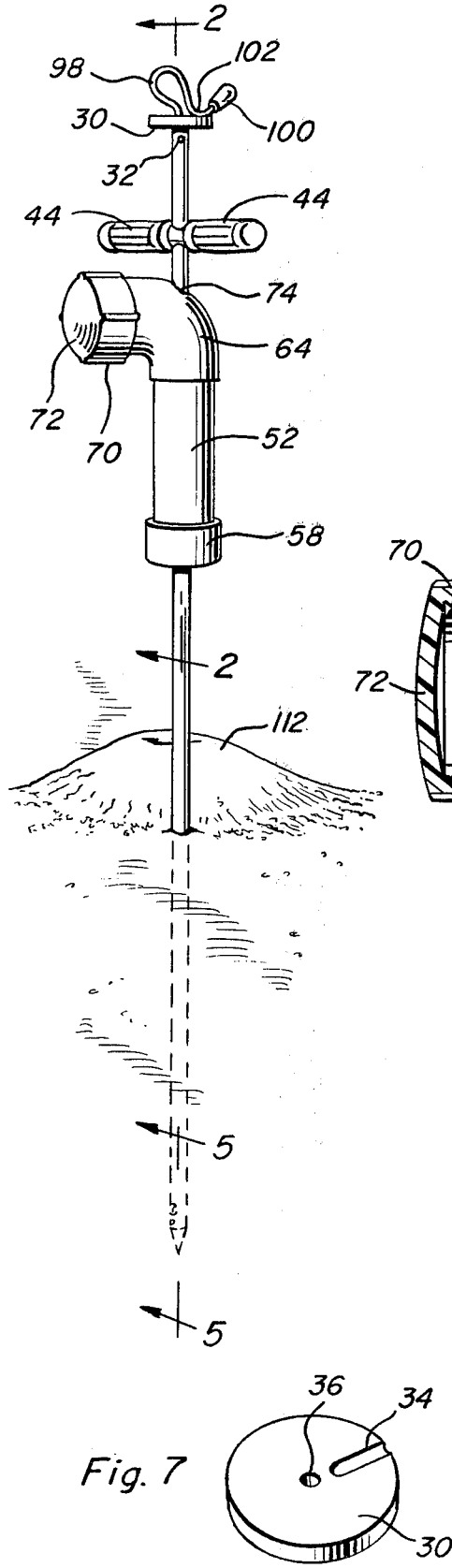
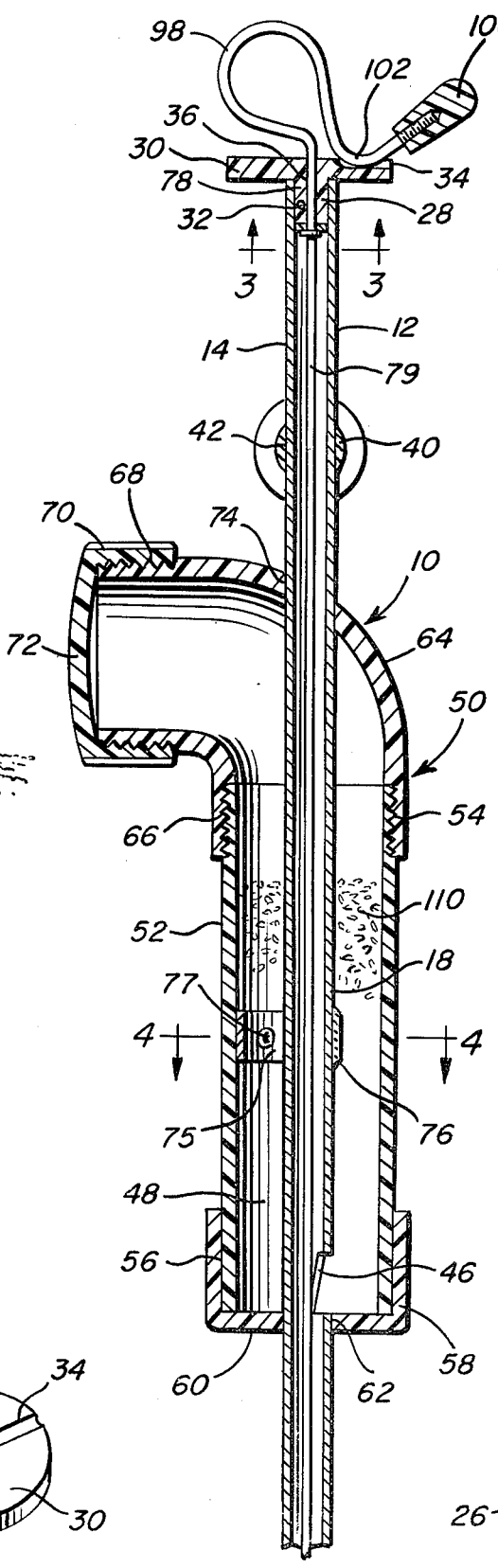
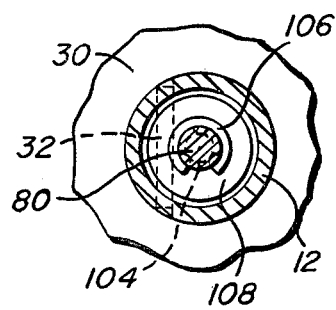
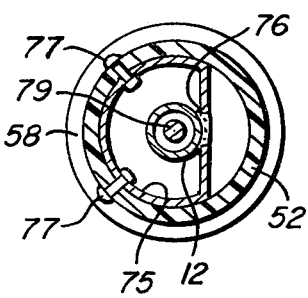
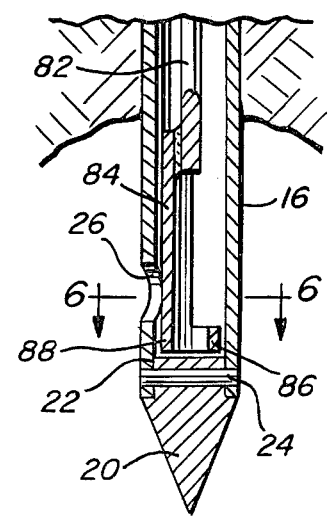
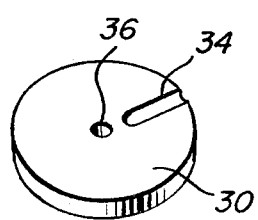
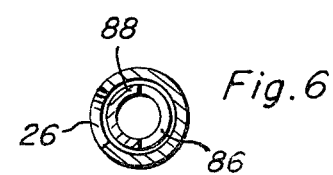

GOPHER PROBE AND POISON DISPENSER

BACKGROUND OF THE INVENTION

In various localities gophers, although beneficial for water retention and ground aerating purposes, become unwanted pests due to uncontrolable damage to orchards, gardens and other types of vegetation. Gophers live in underground burrows which may include individual tunnels or runs of one-half mile or more in length and a community of gophers may build a labyrinth of such underground runs and reproduce in such numbers over relatively short periods of time that they become severe economic liabilities for persons engaged in many different areas of agriculture.

Accordingly, a need exists for a means by which uncontrolled growth of communities of gophers may be terminated and gophers may be locally exterminated at a low cost and with little effort. The probe and poison dispenser of the instant invention is designed to facilitate the location of gopher burrows and enable placement of poisoned grain in the burrows or runs in order to locally eradicate gophers within the burrows.

BRIEF DESCRIPTION OF THE INVENTION

The probe of the instant invention includes an upstanding tube whose lower end is provided with a tapered terminal end for downwardly piercing the ground about a gopher mound until one or more runs extending from the mound have been located. Each time the probe locates a run, the probe may be actuated to deposit a quantity of poisoned grain in the run. The lower end portion of the tube includes a lateral outlet opening immediately above the lower terminal end of the tube and an intermediate height portion of the tube has a lateral port formed therein and a hollow poison reservoir is mounted on the tube and surrounds the portion thereof in which the port is formed whereby poison fluent material may flow directly from the reservoir into the tube through the port provided therein and thereafter downwardly through the tube to the outlet opening. In addition, the lower end portion of the tube includes a rotary valve member angularly displaceable into and out of position closing the outlet opening and the upper end portion of the tube has a valve actuator shiftably supported therefrom. A connecting rod extends through the tube between the actuator and the valve member and is operable to shift the valve member between the open and closed positions thereof responsive to oscillation of the actuator relative to the tube.

The main object of this invention is to provide a ground probe and poison dispenser which may be utilized to effectively probe for and deposit poison grain within gopher runs.

Another object of this invention is to provide a combined probe and dispenser in accordance with the preceding objects and constructed in a manner whereby a sufficient amount of poison grain may be carried by the combined probe and dispenser to enable at least several hours of gopher run probing and poison dispensing before it becomes necessary to replenish the supply of poison grain within the combined probe and poison dispenser.

Yet another object of this invention is to provide a combined probe and dispenser which also may be used for probing for and depositing fluent poison material into mole runs.

A final object of this invention to be specifically enumerated herein is to provide a combined probe and poison dispenser in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the combined probe and poison dispenser in operative association with a ground area immediately adjacent a gopher mound;

FIG. 2 is an enlarged fragmentary vertical sectional view taken substantially upon the plane indicated by the section line 2—2 of FIG. 1;

FIG. 3 is an enlarged fragmentary horizontal sectional view taken substantially upon the plane indicated by the section line 3—3 of FIG. 2;

FIG. 4 is a horizontal sectional view taken substantially upon the plane indicated by the section line 4—4 of FIG. 2;

FIG. 5 is a fragmentary enlarged vertical sectional view taken substantially upon the plane indicated by the section line 5—5 of FIG. 1;

FIG. 6 is a horizontal sectional view taken substantially upon the plane indicated by the section line 6—6 of FIG. 5; and FIG. 7 is a perspective view of the valve member position indicator of the combined probe and dispenser.

DETAILED DESCRIPTION OF THE INVENTION

Referring now more specifically to the drawings, the numeral 10 generally designates the combined probe and dispenser of the instant invention. The probe and dispenser 10 includes an upstanding tubular probe tube 12 including upper and lower end portions 14 and 16 and a vertical midportion 18. The lower end portion 16 includes a downwardly tapered lower terminal end or point 20 supported therefrom, the terminal end 20 including a diametrically reduced shank 22 snugly telescoped upwardly into the lower end portion of the probe tube 12 and secured in position therein through the utilization of a roll pin 24 secured through the shank 22 and the lower end portion 16. In addition, the lower end portion 16 includes a lateral discharge opening 26 spaced slightly above the terminal end 20.

The upper end portion 14 has a depending shank portion 28 of an index disk 30 downwardly telescoped thereinto and secured therein by an off center pin 32 passed through the upper end portion 14 and the shank portion 28. The upper surface of the disk 30 includes a radial groove 34 therein and the center of the disk 30 includes a vertical bore 36 formed therethrough, the bore 36 extending downwardly through the center of the shank portion 28.

A cross tube 40 of an inside diameter substantially equal to the outside diameter of the tube 12 has a vertical bore 42 formed therethrough and the upper end portion 14 of the tube 12 extends through the bore 42 with the cross tube 40 stationarily mounted on the tube 12. The tube 12 passes through the cross tube 40 centrally intermediate its opposite ends and the opposite end portions of the cross tube 40 are equipped with tubular hand grips 44 telescoped thereover.

The midportion of the tube 18 includes a lateral port 46 formed therein and the tube portion having the port 46 formed therein is encircled by the lower portion of the interior 48 of a poison reservoir referred to in general by the reference numeral 50. The poison reservoir 50 comprises a straight section 52 of PVC pipe externally threaded as at 54 at one end and smooth on its exterior on its other end as at 56. A cap 58 is telescoped over the smooth end of the pipe section 52 and is cemented thereon. The cap 58 includes an end wall 60 having a central bore 62 formed therein through which the tube 12 extends, the port 46 being disposed immediately above the end wall 60 of the cap 58.

A PVC elbow 64 internally threaded as at 66 is threaded onto the externally threaded upper end of the pipe section 52 and the elbow 64 is externally threaded as at 68 on its end remote from the internal threads 66. An internally threaded cap 70 is removably threaded onto the externally threaded end 68 of the elbow 64 and includes an end wall 72 closing the upper end of the reservoir 50. Of course, the cap 70 may be removed for introducing fluent material thereinto and thereafter resecured in the closed position.

The tube 12 extends centrally through the pipe section 52 and passes upwardly through a smooth bore 74 formed in the elbow 64 in alignment with the bore 62. A generally D-shaped mount 75 is secured as by brazing 76 to the midportion 18 of the tube 12 and the mount 75 is snugly received within the pipe section 52 and secured relative thereto by radial rivets 77 secured through peripherally spaced wall portions of the pipe section 52 and the mount 75.

The upper end portion 78 of an actuating rod 79 is journaled through bore 36 and the lower end portion 82 of the rod 79 is secured to a substantially half cylindrical upper end portion 84 of a valve member 86 rotatably received within the lower end of the tube 12. The lower end 88 of the valve member 86 is peripherally continuous and the valve member 86 may be rotated between the closed position thereof illustrated in FIGS. 5 and 6 of the drawings allowing fluent material within the tube 12 to pass therefrom outwardly through the opening 26 and an open position with the half cylindrical upper portion 84 of the valve member 86 swung out of registry with the inner end of the opening 26.

The upper end portion 78 of the rod 79 includes an S-shaped terminus 90 having a handle knob 100 mounted on its free end and including a curved portion 102 abutted against the upper surface of the disk 30 and receivable in the notch 34 when the valve member 86 is in the closed position thereof. The terminus 98 is resilient and, therefore, the curved portion 102 is snap received within the groove 34 for frictionally retaining the actuator rod 79 in position with the valve member 86 in the closed position. Of course, the terminus 98 comprises an actuator for the valve member 88 and the rod 79 comprises a connector extending between the actuator and the valve member 86.

The rod 79 has a circumferential groove 104 formed therein and a snap ring 106 is removably seated in the groove. A washer 108 is slidably disposed on the rod 79 above the snap ring 106 and opposes the lower end of the shank portion 28. Accordingly, the snap ring 106 and washer 108 prevent upward displacement of the rod 79 through the bore 36.

In operation, the cap 70 is removed and suitable fluent poison material, such as poisoned grain 110, is placed within the reservoir 50 and the cap 70 is replaced in position closing the upper end of the reservoir. Then, the probe and dispenser 10 may be utilized in the manner illustrated in part in FIG. 1 by causing the lower terminal end 20 of the tube 12 to penetrate the ground about a gopher hill 112. When a gopher run adjacent the hill 112 has been located, the terminus 98 may be rotated approximately 180° to move the valve member 86 from the closed position to the open position thereof whereupon a quantity of the poisoned grain 110 may be discharged through the opening 28 into the gopher run. The cross tube 40 and hand grips 44 thereon may, of course, be used to apply downward pressure on the probe and dispenser in order that the lower terminal end 20 may penetrate the ground. The interior of the reservoir 50 is of sufficient volume whereby considerable gopher mounds and runs may be treated without having to replenish the supply of poisoned grain therein. Also, it is to be noted that it is important that the valve member control the flow of poison grain from the opening 26 rather than rely upon a similar valve member to control the flow of poison grain from the reservoir 50 through the port 46 in order to reduce the possibility of any grain spilling from the dispenser 10 after it has been withdrawn from the ground.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A ground probe and poison dispenser comprising an upstanding tubular shank including upper and lower end portions, said lower end portion including a tapered lower terminal end and a lateral opening formed therein closely spaced above said terminal end, a hollow poison reservoir carried by a midportion of said shank intermediate said upper and lower end portions, port means communicating the interior of said shank midportion with the interior of said reservoir for gravity flow of fluent poison material from said reservoir into said shank midportion and subsequent gravity flow of said poison material downward through said shank into the lower end portion thereof and toward said lateral opening, valve member means mounted in said shank for rotation about an axis extending longitudinally of said shank between closed and open positions relative to said opening closing and opening the latter, valve member control means rotatably supported from said upper end portion of said shank and operatively connected with said valve member through a torsion rod disposed within said shank and extending through the latter to said valve member for rotating the latter between said closed and open positions, said tubular shank including handle means adapted to be engaged by a user for applying downward and upward thrust on said shank independent of said valve member and valve member control means, said hollow poison reservoir including an upstanding cylindrical pipe section considerably larger in inside diameter than the outside diameter of said tubular shank, said tubular shank extending centrally longitudinally through said pipe section, an end cap secured over the lower end of said pipe section and having a central bore formed therethrough, said tubular shank being snugly received through said central bore and longitudinally positioned relative to said pipe section and end cap with said port means disposed closely above said central bore, a 90° tubular elbow including a first internally threaded end threaded over the upper end of said pipe section and including a second externally threaded end opening horizontally outwardly of one side of said pipe section, a closure cap removably threaded over said second end, said elbow including a smooth bore formed therethrough aligned with said central bore and through which the upper end portion of said tubular shank is snugly received, said handle means including generally diametrically opposite outwardly projecting handle structures carried by said tubular shank a spaced distance above said elbow and below the upper end of said shank, a mount fixed on said tubular shank and snugly slidably received in said pipe section, fastener means secured through said pipe section and securing said mount in position within said pipe section, the upper end of said tubular shank including a generally circular and centrally apertured disc secured thereacross, said torsion rod projecting upwardly and being rotatably received through said centrally apertured disc and including a reversely curved terminus thereon terminating downwardly in an upwardly and downwardly curved portion whose terminal end includes a hand grip spaced outward of said disc, the upper end portion of said torsion rod being somewhat resilient, said disc including a generally radial groove formed in the upper surface thereof, said upwardly and outwardly curved portion comprising a detent snap receivable within said groove for frictionally retaining said torsion rod in adjusted angularly displace position.

* * * * *